(12) United States Patent
Vijayan

(10) Patent No.: US 11,023,848 B1
(45) Date of Patent: Jun. 1, 2021

(54) SYSTEMS AND METHODS FOR CALL DEFLECTION FOR PRODUCT RETURN OR EXCHANGE

(71) Applicant: Coupang, Corp., Seoul (KR)

(72) Inventor: Remesh Vijayan, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 16/799,093

(22) Filed: Feb. 24, 2020

(51) Int. Cl.
| G06Q 10/08 | (2012.01) |
| H04L 29/08 | (2006.01) |
| G06Q 30/00 | (2012.01) |
| G06F 16/23 | (2019.01) |

(52) U.S. Cl.
CPC ..... *G06Q 10/0837* (2013.01); *G06F 16/2379* (2019.01); *G06Q 10/0838* (2013.01); *G06Q 10/0875* (2013.01); *G06Q 30/016* (2013.01); *H04L 67/02* (2013.01)

(58) Field of Classification Search
CPC ... G06Q 10/08; G06Q 10/087; G06Q 10/0875
USPC .................................................... 705/28, 29
See application file for complete search history.

(56) References Cited

U.S. PATENT DOCUMENTS

| 9,247,054 | B2 * | 1/2016 | Sharma | H04M 3/24 |
| 9,613,516 | B2 * | 4/2017 | Glasgow | G08B 21/182 |
| 9,830,647 | B2 * | 11/2017 | Davis | G06Q 40/12 |
| 10,064,055 | B2 * | 8/2018 | Raleigh | H04W 12/1204 |
| 10,185,962 | B2 * | 1/2019 | Bacallao | G06K 19/07758 |
| 10,282,757 | B1 * | 5/2019 | Bitoun | G06Q 30/0251 |
| 10,346,792 | B2 * | 7/2019 | Esfhani | G06Q 10/087 |
| 10,496,951 | B1 * | 12/2019 | Kandukuri | G06Q 30/0641 |
| 10,572,852 | B2 * | 2/2020 | Santo, Jr. | G06Q 10/06 |
| 2004/0193438 | A1 * | 9/2004 | Stashluk, Jr. | G06Q 30/016 705/304 |
| 2014/0143018 | A1 * | 5/2014 | Nies | G06Q 30/016 705/7.32 |
| 2017/0091780 | A1 * | 3/2017 | Kannan | G06F 16/3331 |
| 2018/0115644 | A1 * | 4/2018 | Al-Khaja | H04M 3/5191 |
| 2020/0349577 | A1 * | 11/2020 | Pranesh | G06Q 20/4016 |

* cited by examiner

*Primary Examiner* — Andrew Joseph Rudy
(74) *Attorney, Agent, or Firm* — Finnegan, Henderson, Farabow, Garrett & Dunner LLP

(57) ABSTRACT

The embodiments of the present disclosure provide systems and methods for call deflection, comprising receiving, via a telephone communication from a mobile device of a user, a request for return or exchange, accessing a purchase history of the user to identify at least one order satisfying a predetermined return criteria, generating a unique hyperlink for the user, sending the unique hyperlink to the mobile device of the user, receiving, from the mobile device of the user, a selection of at least one product in the at least one order for return or exchange, and modifying a database to register the at least one product for return or exchange. The unique hyperlink may be assigned to the at least one order that satisfies the predetermined return criteria such that, when activated by the user, the mobile device is configured to display the at least one order.

20 Claims, 9 Drawing Sheets

SYSTEMS AND METHODS FOR CALL DEFLECTION FOR PRODUCT RETURN OR EXCHANGE

TECHNICAL FIELD

The present disclosure generally relates to computerized systems and methods for call deflection for product return or exchange requests. In particular, embodiments of the present disclosure relate to inventive and unconventional systems related to call deflection using interactive voice response (IVR), a return management service (RMS) rule engine, and a messaging system.

BACKGROUND

Systems and methods for deflecting customer calls to facilitate returns already exist. For example, conventional systems and methods use interactive voice response (IVR) systems to deflect calls from customers to customer service. Conventional IVR systems present customers with various menu options, including an option for customers to speak to a customer service agent. Often times, customers choose to speak to customer service agents to facilitate a product return or exchange. Therefore, it is difficult to induce customers to use the IVR system to facilitate product return or exchange because customers feel uneasy about returning or exchanging a product via self-service. Customers tend to seek direct communications with customer service agents to make sure that their return or exchange requests processed smoothly. Due to many customers choosing to speak directly with customer service agents rather than using the IVR system to facilitate returns or exchanges, customer service agents become overwhelmed and the queue to speak with customer service agents become increasingly longer.

In addition, conventional IVR systems are not well-suited to deflect calls from customers, who want to process a return or exchange request for orders, because many customers often make multiple orders, including multiple products, in a single day. Moreover, because return periods are generally 30 days or longer, even customers who make less orders in a single day may have multiple orders that could be returned within the return period. Furthermore, customers often want to return a part of an order, containing multiple products. For example, customers may often want to return only one of the products in a particular order. Accordingly, using conventional IVR systems to process a return or exchange may be difficult, time-consuming, and inefficient because conventional systems will need to walk customers through their order history such that customers can select one or more products for return or exchange.

Therefore, there is a need for improved systems and methods for call deflection to facilitate product return or exchange.

SUMMARY

One aspect of the present disclosure is directed to a computer-implemented system for call deflection. The system may comprise a memory storing instructions and at least one processor configured to execute the instructions. The at least one processor may be configured to execute the instructions to receive, via a telephone communication from a mobile device of a user, a request for return or exchange, access a purchase history of the user to identify at least one order satisfying a predetermined return criteria, generate a unique hyperlink, send the unique hyperlink to the mobile device of the user, receive, from the mobile device of the user, a selection of a product in the at least one order for return or exchange, and modify a database to register the product for return or exchange. The unique hyperlink may be assigned to the at least one order that satisfied the predetermined return criteria such that, when activated by the user, the mobile device is configured to display the at least one order.

In some embodiments, accessing the purchase history of the user may comprise identifying, from the database, every order that is mapped to a phone number associated with the mobile device of the user. In some embodiments, the at least one processor may be further configured to execute the instructions to send instructions to a remote device to retrieve the product for return or exchange from the user. In other embodiments, when the unique hyperlink is activated by the user, the mobile device may be configured to display every product in every order that satisfies the predetermined return criteria.

In some embodiments, the at least one order may satisfy the predetermined return criteria if each product in the at least one order does not exceed a predetermined cost threshold. In other embodiments, the at least one order may satisfy the predetermined return criteria if at least one product in the at least one order does not exceed a predetermined expiration period for return or exchange. In yet another embodiment, the at least one order may satisfy the predetermined return criteria if each product in the at least one order is eligible for online return or exchange. In some embodiments, the at least one order may satisfy the predetermined return criteria if at least one product in the at least one order is eligible for online return or exchange. In other embodiments, the at least one order may satisfy the predetermined return criteria if the user associated with the at least one order is not associated with a prior violation. Additionally or alternatively, the at least one order may satisfy the predetermined return criteria if the at least one order is not associated with additional requests for return or exchange.

Another aspect of the present disclosure is directed to a computer-implemented method for call deflection. The method may comprise receiving, via a telephone communication from a mobile device of a user, a request for return or exchange, accessing a purchase history of the user to identify at least one order satisfying a predetermined return criteria, generating a unique hyperlink, sending the unique hyperlink to the mobile device of the user, receiving, from the mobile device of the user, a selection of a product in the at least one order for return or exchange, and modifying a database to register the product for return or exchange. The unique hyperlink may be assigned to the at least one order that satisfied the predetermined return criteria such that, when activated by the user, the mobile device is configured to display the at least one order.

In some embodiment, accessing the purchase history of the user may comprise identifying, from the database, every order that is mapped to a phone number associated with the mobile device of the user. In some embodiments, the method may further comprise sending instructions to a remote device to retrieve the product for return or exchange from the user. In other embodiments, when the unique hyperlink is activated by the user, the mobile device may be configured to display every product in every order that satisfies the predetermined return criteria.

In some embodiments, the at least one order may satisfy the predetermined return criteria if each product in the at least one order does not exceed a predetermined cost threshold. In other embodiments, the at least one order may satisfy the predetermined return criteria if at least one product in the at least one order does not exceed a predetermined expiration period for return or exchange. In yet another embodiment, the at least one order may satisfy the predetermined return criteria if each product in the at least one order is eligible for online return or exchange. In some embodiments, the at least one order may satisfy the predetermined return criteria if at least one product in the at least one order is eligible for online return or exchange. Additionally or alternatively, the at least one order may satisfy the predetermined return criteria if the at least one order is not associated with additional requests for return or exchange.

Yet another aspect of the present disclosure is directed to a computer-implemented system for call deflection. The system may comprise a memory storing instructions and at least one processor configured to execute the instructions. The at least one processor may be configured to execute the instructions to receive, via a telephone communication from a mobile device of a user, a request for return or exchange, access a purchase history of the user to identify at least one order satisfying a predetermined return criteria, generate a unique hyperlink, send the unique hyperlink to the mobile device of the user, receive, from the mobile device of the user, a selection of a product in the at least one order for return or exchange, and modify a database to register the product for return or exchange. The at least one order may satisfy the predetermined return criteria if a product in the at least one order is eligible for online return or exchange, and if each product in the at least one order does not exceed a predetermined cost threshold. In addition, the unique hyperlink may be assigned to the at least one order that satisfied the predetermined return criteria such that, when activated by the user, the mobile device is configured to display the at least one order.

Other systems, methods, and computer-readable media are also discussed herein.

DETAILED DESCRIPTION

Figure 1A:
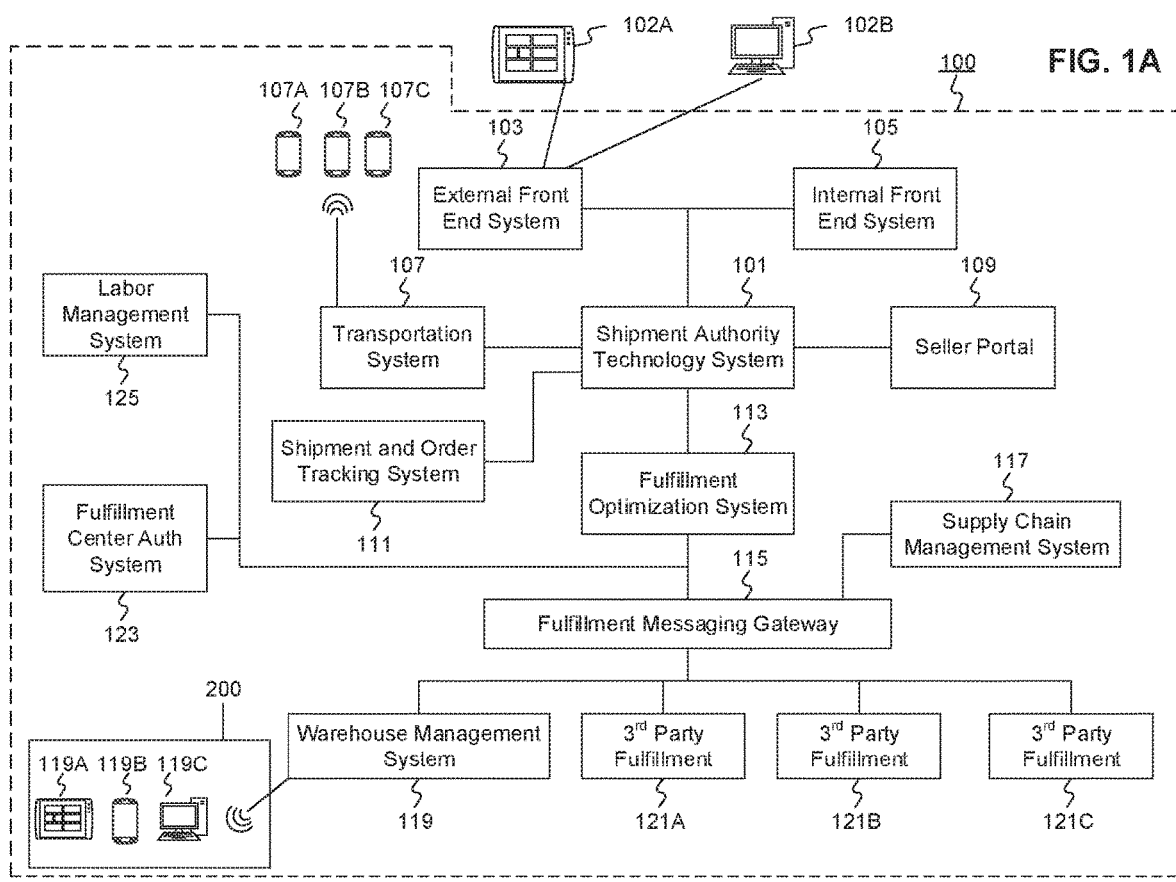
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for call deflection using interactive voice response (IVR), return management service (RMS) rule engine, and a messaging system. In particular, embodiments of the present disclosure are directed to improved systems and methods for call deflection using an IVR system, a return management service (RMS) rule engine that determines whether an order associated with the user satisfies a predetermined return criteria, and a messaging system that sends a unique hyperlink to a mobile device of the user to facilitate the return or exchange via a software application. Accordingly, even when the user calls and reaches an IVR system, the user may be able to conveniently and efficiently facilitate a product return or exchange using a software application on a mobile device of the user, rather than waiting on queue to speak to a customer service agent.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where network 101 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or 3rd party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMA 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
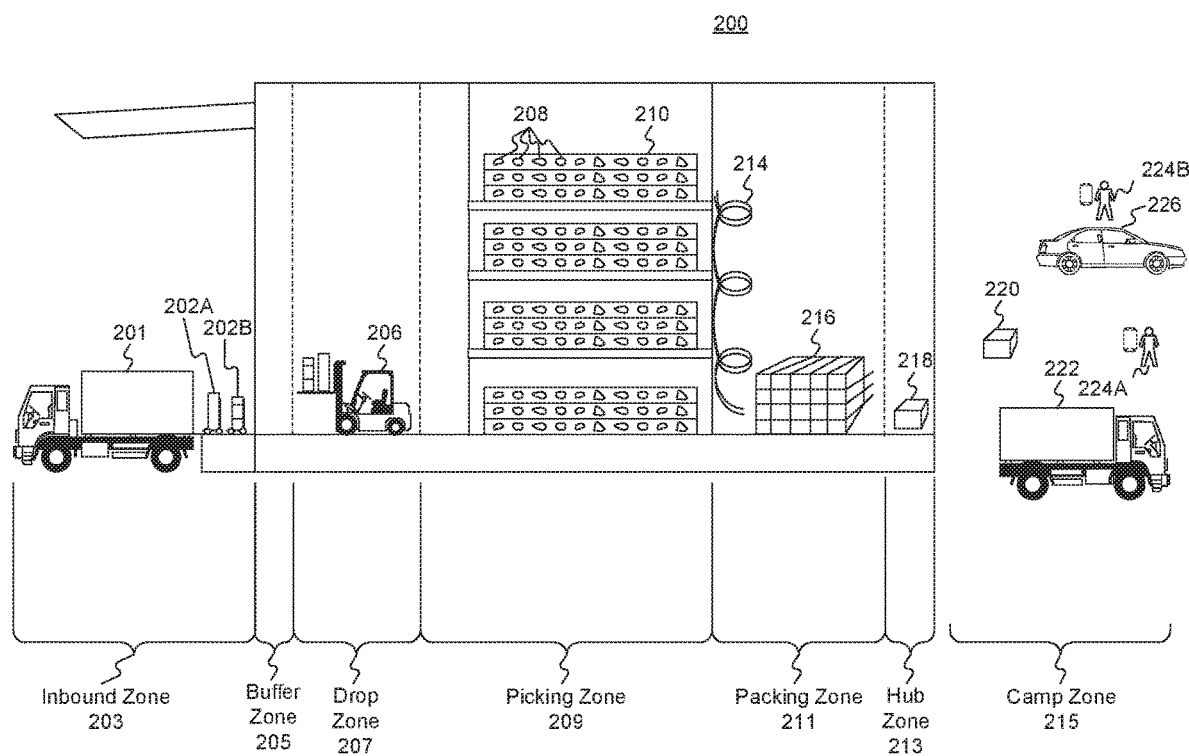
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207.

If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
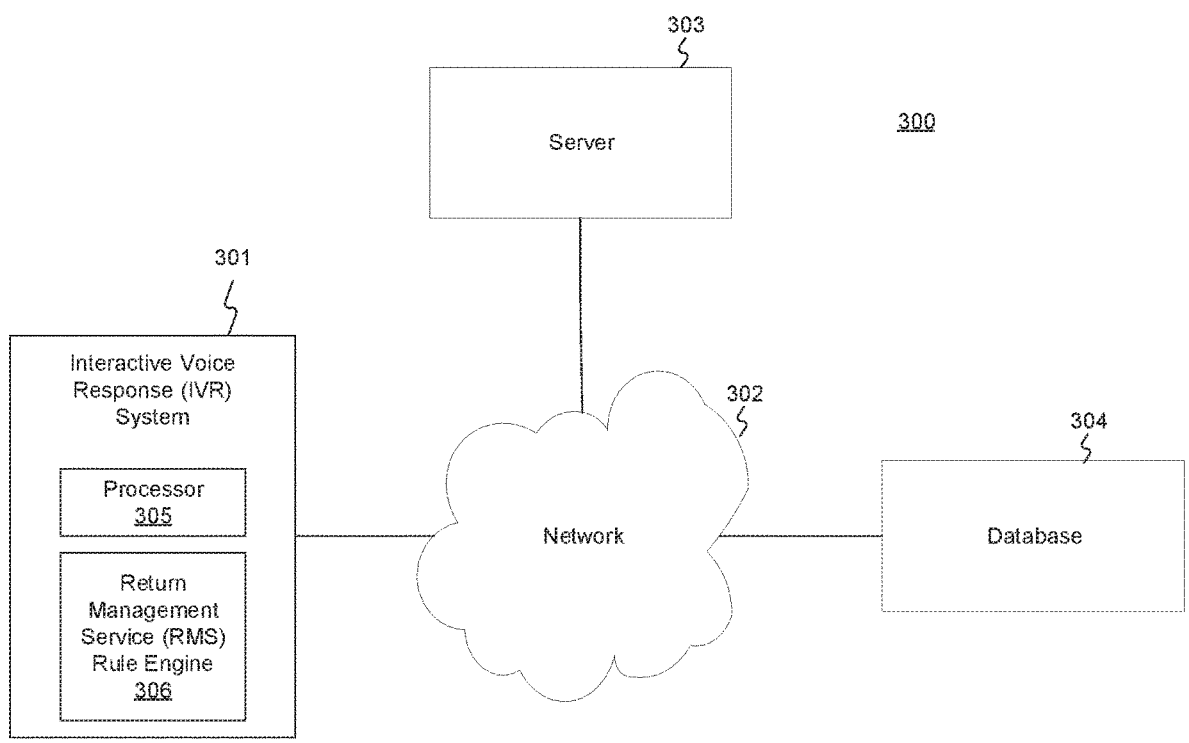
FIG. 3 is a schematic block diagram illustrating an exemplary embodiment of a system for call deflection, consistent with the disclosed embodiments.

Referring to FIG. 3, a schematic block diagram 300 illustrating an exemplary embodiment of a system comprising an interactive voice response (IVR) system 301. IVR system 301 may be associated with one or more systems in system 100 of FIG. 1A. IVR system 301, in some embodiments, may be implemented as a computer system that allows one or more systems in system 100 of FIG. 1A to interact with customers through the use of voice and dual-tone multi-frequency signaling (DTMF) tones input, for example, via a keypad on a mobile device. Accordingly, IVR system 301 may allow customers to interact with one or more systems in system 100 of FIG. 1A via a keypad on a mobile device or by known speech/voice recognition algorithm(s). IVR system 301 may include one or more processors 305, which may store pre-recorded or dynamically generated responses in a database, such as database 304. Accordingly, one or more processors 305 may allow IVR system 301 to have a dialogue with customers and direct customers to various services provided by one or more systems in system 100 of FIG. 1A. One or more processors 305 may also be configured to receive audio signals from a mobile device of a customer and process the audio signals, using speech recognition, to determine one or more requests made by the customer. For example, one or more processors 305 may be configured to identify words and phrases in spoken language and convert them into a machine-readable format. In other embodiments, one or more processors 305 may receive one or more inputs via a keypad from the mobile device of the customer and process the inputs to determine one or more requests made by the customer.

In some embodiments, one or more processors 305 may be configured to access a purchase history of a customer. For example, one or more processors 305 may be configured to look up one or more previous orders associated with the customer from a database, such as database 304. In some embodiments, when one or more processors 305 of IVR system 301 receives a telephone communication from a mobile device of a user, one or more processors 305 may be configured to extract a phone number associated with the mobile device of the user and look up the user's purchase history from database 304 based on the extracted phone number. For example, one or more processors 305 may be configured to identify one or more previous orders stored in database 304 that are associated with the extracted phone number.

In other embodiments, IVR system 301 may comprise a return management service (RMS) rule engine 306. RMS rule engine 306, for example, may generate and store a predetermined return criteria for facilitating a return or exchange for a user. Additionally or alternatively, the predetermined return criteria may be stored in database 304. Additionally or alternatively, RMS rule engine 306 may be preconfigured with the predetermined return criteria. In some embodiments, one or more processors 305 may be configured to receive a request for return or exchange from a user and determine whether the user has at least one order that satisfies the predetermined return criteria. Accordingly, one or more processors 305 may be configured to access a purchase history of the user and identify at least one order satisfying the predetermined return criteria generated by RMS rule engine 306. In some embodiments, RMS rule engine 306 may be configured to generate a unique hyperlink for the user to select one or more products for return or exchange. One or more processors 305 may send the unique hyperlink generated by RMS rule engine 306 to the user, for example via a messaging system. The messaging system may comprise, for example, a third-party messaging system, a component within IVR system 301, a component or server in communication with the IVR system 301, or the like. Accordingly, one or more processors 305 may send a message to the mobile device of the user via a short message service (SMS) or an application push notification with the unique hyperlink. Additionally or alternatively, the message may be sent to the mobile device of the user via a multimedia messaging service (MMS), a long messaging service (LMS), and/or e-mail. The user may click on the unique hyperlink to access a list of orders and/or products that the user can select to facilitate a return or exchange.

In some embodiments, database 304 may include one or more memory devices that store information and are accessed through network 302. By way of example, database 304 may include Oracle™ databases, Sybase™ databases, or other relational databases or non-relational databases, such as Hadoop sequence files, HBase, or Cassandra. While database 304 is illustrated as being included in the system 300, it may alternatively be located remotely from system 300. In other embodiments, database 304 may be incorporated into IVR system 301. Database 304 may include computing components (e.g., database management system, database server, etc.) configured to receive and process requests for data stored in memory devices of database 304 and to provide data from database 304.

System 300 may also comprise a network 302 and a server 303. IVR system 301, server 303, and database 304 may be connected and be able to communicate with each other via network 302. Network 302 may be one or more of a wireless network, a wired network or any combination of wireless network and wired network. For example, network 302 may include one or more of a fiber optic network, a passive optical network, a cable network, an Internet network, a satellite network, a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11b, 802.15.1, 802.11n and 802.11g or any other wired or wireless network for transmitting and receiving data.

In addition, network 302 may include, but not be limited to, telephone lines, fiber optics, IEEE Ethernet 802.3, a wide area network ("WAN"), a local area network ("LAN"), or a global network such as the Internet. Also network 302 may support an Internet network, a wireless communication network, a cellular network, or the like, or any combination thereof. Network 302 may further include one network, or any number of the exemplary types of networks mentioned above, operating as a stand-alone network or in cooperation with each other. Network 302 may utilize one or more protocols of one or more network elements to which they are communicatively coupled. Network 302 may translate to or from other protocols to one or more protocols of network devices. Although network 302 is depicted as a single network, it should be appreciated that according to one or more embodiments, network 302 may comprise a plurality of interconnected networks, such as, for example, the Internet, a service provider's network, a cable television network, corporate networks, and home networks.

Server 303 may be a web server. Server 303, for example, may include hardware (e.g., one or more computers) and/or software (e.g., one or more applications) that deliver web content that can be accessed by, for example a user through a network (e.g., network 302), such as the Internet. Server 303 may use, for example, a hypertext transfer protocol (HTTP or sHTTP) to communicate with a user. The web pages delivered to the user may include, for example, HTML documents, which may include images, style sheets, and scripts in addition to text content.

A user program such as, for example, a web browser, web crawler, or native mobile application, may initiate communication by making a request for a specific resource using HTTP and server 303 may respond with the content of that resource or an error message if unable to do so. Server 303 also may enable or facilitate receiving content from the user so the user may be able to, for example, submit web forms, including uploading of files. Server 303 may also support server-side scripting using, for example, Active Server Pages (ASP), PHP, or other scripting languages. Accordingly, the behavior of server 303 can be scripted in separate files, while the actual server software remains unchanged.

In other embodiments, server 303 may be an application server, which may include hardware and/or software that is dedicated to the efficient execution of procedures (e.g., programs, routines, scripts) for supporting its applied applications. Server 303 may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model. Server 303 may act as a set of components accessible to, for example, an entity implementing system 100, through an API defined by the platform itself.

Figure 4:
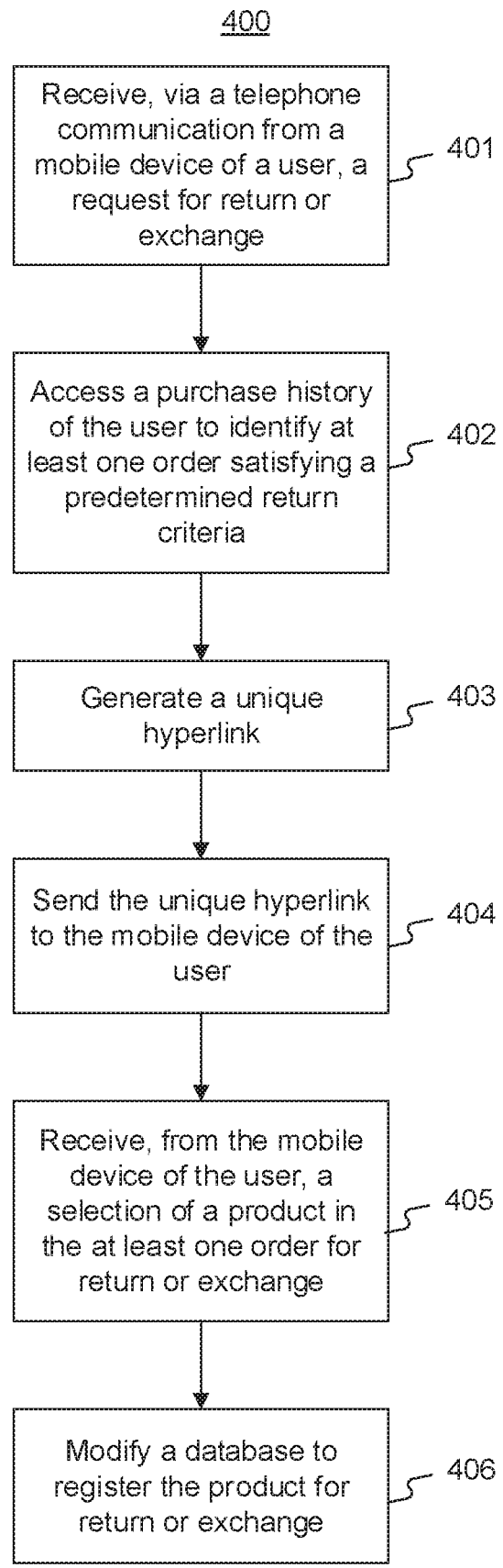
FIG. 4 is a flowchart illustrating an exemplary embodiment of a method for call deflection, consistent with the disclosed embodiments.

FIG. 4 is a flow chart illustrating an exemplary method 400 for call deflection. This exemplary method is provided by way of example. Method 400 shown in FIG. 4 can be executed or otherwise performed by one or more combinations of various systems. Method 400 as described below may be carried out by IVR system 301, as shown in FIG. 3, by way of example, and various elements of that system are referenced in explaining the method of FIG. 4. Each block shown in FIG. 4 represents one or more processes, methods, or subroutines in the exemplary method 400. Referring to FIG. 4, exemplary method 400 may begin at block 401.

At block 401, one or more processors 305 may receive, via a telephone communication from a mobile device of a user, a request for return or exchange. In some embodiments, one or more processors 305 may receive a request for return or exchange from a mobile device of a user via a voice communication over data lines, such as voice calls over a software application or a web browser. For example, the user may use the mobile device to make a phone call to customer service to return or exchange one or more previously purchased products. After one or more processors 305 of IVR system 301 receives the request for return or exchange, one or more processors 305 of IVR system 301 may proceed to block 402. At block 402, one or more processors 305 may access a purchase history of the user to identify at least one order satisfying a predetermined return criteria. For example, one or more processors 305 may look up one or more previous orders associated with the user in database 304. In some embodiments, one or more processors 305 may process the telephone communication from the mobile device of the user and extract a phone number associated with the mobile device of the user. Then, one or more processors 305 may look up the phone number in database 304 and identify previous orders that are mapped to the phone number.

In order to identify at least one order that satisfies a predetermined return criteria, one or more processors 305 may apply the predetermined return criteria generated, for example, by RMS rule engine 306. The predetermined return criteria may establish one or more rules to determine whether one or more previous orders associated with the user are eligible for return or exchange via IVR system 301. By way of example, according to the predetermined return criteria, one or more previous orders associated with the user may not be eligible for return or exchange via IVR system 301 if at least one product is too expensive, if the user has returned at least one product in a predetermined time period, if at least one product is not eligible for return or exchange, if a return or exchange period for at least one product has expired, if at least one product is not eligible for online return, if there is no purchase history associated with the user, if the number of products for return or exchange exceeds a predetermined threshold, if the user is associated with a prior violation in database 304 for previous attempts of fraud or policy violation, or if at least one product is associated with additional requests for return or exchange. For example, database 304 may store a tiered list of users, and each tier may be associated with a security level associated with a user. If the user is not associated with any prior violation, such as a fraud, a theft, or a policy violation, the user may be associated with a first tier in database 304. If the user is associated with one prior violation, the user may be associated with a second tier in database 304. If the user is associated with two or more prior violations, the user may be associated with a third tier in database 304.

For example, one or more orders may satisfy the predetermined return criteria if each product in the one or more orders does not exceed a predetermined cost threshold, such as $1000 USD. In some embodiments, one or more orders may satisfy the predetermined return criteria if at least one product in the one or more orders does not exceed a predetermined expiration period for return or exchange, such as 30 days from a purchase date. Additionally or alternatively, the one or more orders comprise a product that exceeds the predetermined expiration period for return or exchange and another product that does not exceed the predetermined expiration period for return or exchange, the one or more orders may still satisfy the predetermined return criteria and may be eligible for return or exchange. However, the product that exceeds the predetermined expiration period for return or exchange may not be made selectable or activatable by the user on a mobile device of the user. For example, the product that exceeds the predetermined expiration period for return or exchange may be grayed out, crossed out, or the like when displayed on the mobile device of the user. In other embodiments, one or more orders may satisfy the predetermined return criteria if each product in the one or more orders is eligible for online return or exchange. For example, some products, such as perishable products or products that exceed a maximum size dimension or weight, may not be eligible for return or exchange online. As such, the user may need to bring the product into a brick and mortar store in order to return or exchange the product. Therefore, unless every product previously purchased by the user is eligible for online return or exchange, one or more orders associated with the user may not satisfy the predetermined return criteria, and the user may not return or exchange the product using IVR system 301. Additionally or alternatively, one or more orders may satisfy the predetermined return criteria if at least one product in the one or more orders is eligible for online return or exchange. Therefore, as long as one product previously purchased by the user is eligible for online return or exchange, the user may be allowed to return or exchange products using IVR system 301. In some embodiments, one or more orders associated with the user may satisfy the predetermined return criteria if the user is not associated with a prior violation in database 304. For example, database 304 may store a list of users who are associated with a prior violation for previous attempts of policy violation, theft, or fraud. By way of example, database 304 may store a tiered list of users, and each tier may be associated with a security level associated with a user. If the user is not associated with any prior violation, such as a fraud, a theft, or a policy violation, the user may be associated with a first tier in database 304. If the user is associated with one prior violation, the user may be associated with a second tier in database 304. If the user is associated with two or more prior violations, the user may be associated with a third tier in database 304. If one or more processors 305 identify the user associated with one or more orders in the list of users who are associated with a prior violation, for example in the second tier or the third tier, in database 304, one or more processors 305 may determine that one or more orders associated with the user do not satisfy the predetermined return criteria generated by RMS rule engine 306. Additionally or alternatively, one or more orders associated with the user may satisfy the predetermined return criteria if the one or more orders is not already associated with additional requests for return or exchange. For example, if one or more processors 305 determines, from data stored in database 304, that the user has already requested a return or exchange previously for one or more orders, then one or more processors 305 may determine that the one or more orders do not qualify for return or exchange based on the predetermined return criteria generated by RMS rule engine 306.

After identifying at least one order satisfying the predetermined return criteria, method 400 may proceed to block 403. At block 403, one or more processors 305 may generate a unique hyperlink. The unique hyperlink may comprise unique hypertext, which when activated by the user usually by clicking on the hyperlink, may navigate the user to a web browser or a software application. The hyperlink may be unique to the at least one order satisfying the predetermined return criteria. Accordingly, the hypertext contained in each unique hyperlink generated may be different for each request for return or exchange. After generating the unique hyperlink, method 400 may proceed to block 404.

At block 404, one or more processors 305 may send the unique hyperlink to the mobile device of the user. By way of example, the unique hyperlink may be assigned to the at least one order that satisfies the predetermined return criteria. Accordingly, when the user activates the unique hyperlink, for example by clicking on the hyperlink, the mobile device of the user may be configured to display the at least one order (e.g., order-level display). Additionally or alternatively, when the user activates the unique hyperlink, the mobile device of the user may be configured to display every product in every order associated with the user that satisfies the predetermined return criteria (e.g., product-level display). As such, the mobile device may display every product that the user has previously purchased and that is eligible for return or exchange via IVR system 301. Accordingly, it may be easier for the user to select the specific product(s) that the user would like to request for return or exchange. In addition, it may be easier for the user to select a subset quantity of a specific product that the user would like to request for return or exchange. In contrast, it may be difficult for conventional systems (e.g., customer service agents) to handle returns on a product-by-product basis.

In some embodiments, at block 404, one or more processors 305 may send the unique hyperlink to the mobile device of the user using a messaging system. For example, one or more processors 305 may send a message to the mobile device of the user via a short message service (SMS) or an application push notification with the unique hyperlink. Additionally or alternatively, if one or more processors 305 may send the unique hyperlink to another mobile device different from the mobile device of the user. For example, if one or more processors 305 receives a request for return or exchange from a mobile device of the user and a phone number associated with the mobile device of the user is not associated with the user in database 304, one or more processors 305 may send the unique hyperlink to another device with a phone number that is associated with the user in database 304. In other embodiments, one or more processors 305 may prompt the user to confirm and/or provide a phone number of a mobile device, at which the user would like to receive the unique hyperlink. Additionally or alternatively, one or more processors 305 may prompt the user to confirm and/or provide an e-mail address or other identifiers associated with the user for receiving the unique hyperlink.

In some embodiments, one or more processors 305 may send a message to the mobile device of the user via the application push notification without the unique hyperlink. For example, when one or more processors 305 is configured to process a return or exchange by sending an application push notification to the mobile device of the user, a unique hyperlink may not be necessary. Instead, one or more processors 305 may send a message to the mobile device of the user via the application push notification, and when the user opens the message, one or more processors 305 may automatically direct the mobile device of the user to display the application such that the user can access a list of orders and/or products that the user can select to facilitate a return or exchange.

According to the embodiments of the present disclosure, the user may click on the unique hyperlink to access a list of orders and/or products that the user can select to facilitate a return or exchange. In some embodiments, when the user clicks on the unique hyperlink to activate it, the mobile device may be configured to open a software application on the mobile device. In some embodiments, when the user clicks on the unique hyperlink to activate it, the mobile device may be configured to open a web browser on the mobile device, displaying the list of orders and/or products that the user can select to facilitate a return or exchange. Accordingly, the user may be directed to the software application to send a request for return or exchange. Therefore, instead of a customer service agent facilitating a return or exchange of a product via a telephone communication, the user may quickly and efficiently have a request for return or exchange processed via a software application on the mobile device of the user. As such, the user will not have to wait a long time on the phone for the customer service agent to complete the request for return or exchange, and customer service agents will not be overwhelmed with a large number of customer calls for product return or exchange.

Once the user receives the unique hyperlink on the mobile device, the user may select a product for return or exchange. As such, method 400 may proceed to block 405. At block 405, one or more processors 305 may receive, from the mobile device of the user, a selection of a product for return or exchange in the at least one order that satisfies the predetermined return criteria. In some embodiments, after receiving the selection, one or more processors 305 may submit the request for return or exchange for the selected product to RMS rule engine 306. Once one or more processors 305 receives the selection from the user, method 400 may proceed to block 406. At block 406, one or more processors 305 may modify a database, such as database 304, to register the product for return or exchange. Additionally or alternatively, one or more processors 305 may send instructions to one or more systems in system 100 of FIG. 1A to fulfill the user's request for product return or exchange. For example, one or more processors 305 may send instructions to SCM system 117 of FIG. 1A to pick up the product for return or exchange from the user. In other embodiments, one or more processors 305 may send instructions to a delivery worker, such as delivery workers 224A and 224B of FIG. 2, to pick up the product for return or exchange from the user. In yet another embodiment, one or more processors 305 may send instructions to a transportation management system, such as transportation system 107 of FIG. 1A, to dispatch one or more delivery workers, such as delivery workers 224A and 224B of FIG. 2, and/or one or more vehicles, such as truck 222 and/or car 226 of FIG. 2, to pick up the product for return or exchange from the user. In some embodiments, after modifying a database, such as database 304, to register the product for return or exchange, one or more processors 305 may process a refund for the customer when the predetermined return criteria is met and customer chose return.

Figure 5:
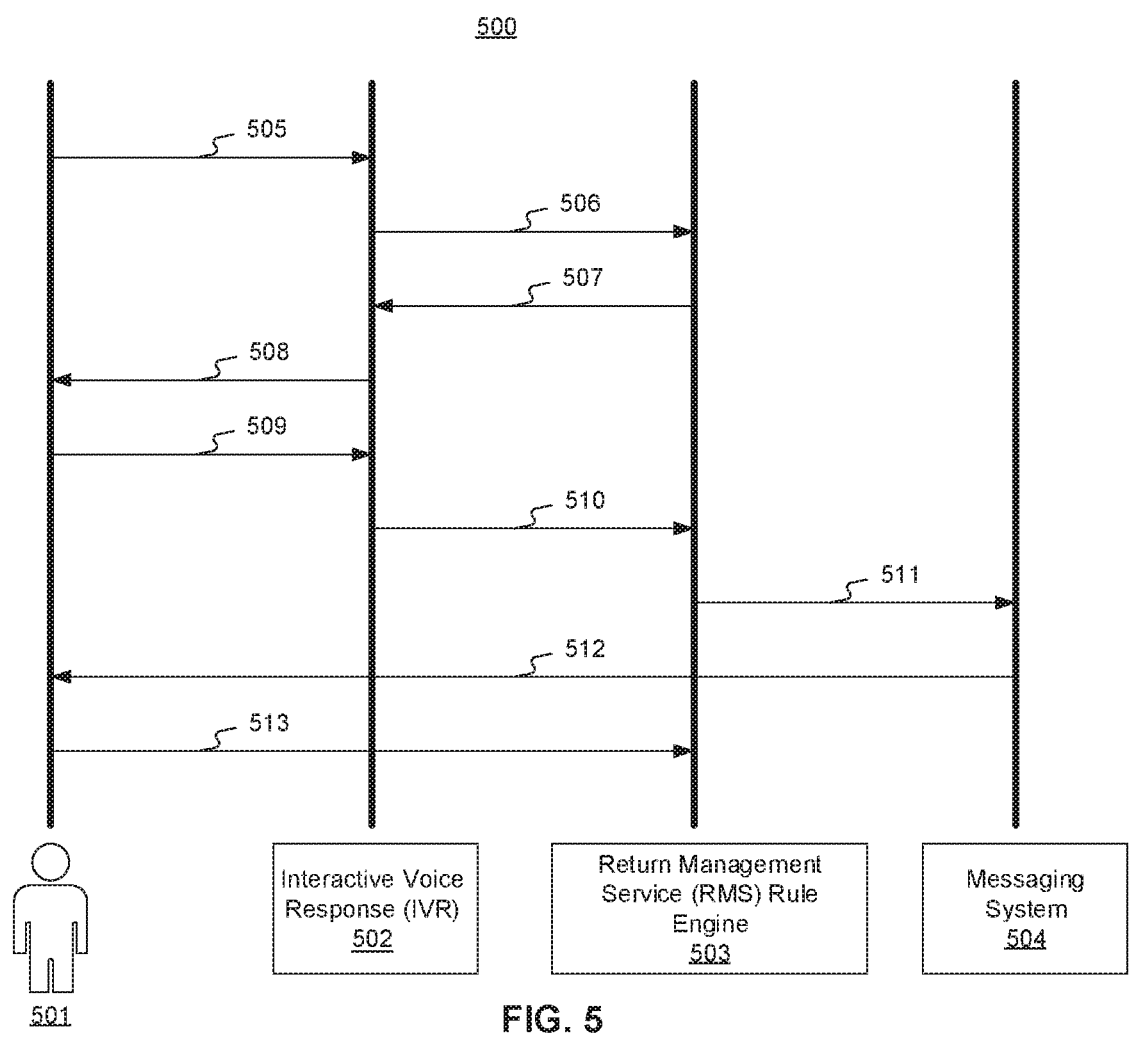
FIG. 5 is a schematic block diagram illustrating an exemplary embodiment of a method for call deflection, consistent with the disclosed embodiments.

FIG. 5 is a schematic block diagram 500 illustrating an exemplary embodiment of method for call deflection. System 500 may comprise a user 501, an IVR system 502, an RMS rule engine 503, and a messaging system 504. IVR system 502 may correspond to IVR system 301 of FIG. 3. Additionally or alternatively, RMS rule engine 503 may correspond to RMS rule engine 306 of FIG. 3.

IVR system 502 may be an application running on a server, such as server 303. IVR system 502 may be configured to interact with customers, such as user 501, through the use of voice and dual-tone multi-frequency signaling (DTMF) tones input, for example, via a keypad on a mobile device. Accordingly, IVR system 502 may allow customers to interact with one or more systems in system 100 of FIG. 1A via a keypad on a mobile device or by speech recognition. IVR system 502 may include one or more processors, which may store pre-recorded or dynamically generated responses in a database.

RMS rule engine 503 may be an application running on a server, such as sever 303. RMS rule engine 503, for example, may be configured to generate and store a predetermined return criteria for facilitating a return or exchange for a user. Additionally or alternatively, the predetermined return criteria may be stored in a database. Additionally or alternatively, RMS rule engine 503 may be preconfigured with the predetermined return criteria. In some embodiments, RMS rule engine 503 may be configured to generate a unique hyperlink for user 501 to select one or more products for return or exchange. The unique hyperlink may be sent to user 501 via a messaging system, such as messaging system 504.

Messaging system 504 may be an application running on a server, such as server 303. Messaging system 504 may be configured to send, for example, a unique hyperlink generated by RMS rule engine 503 to user 501. Accordingly, messaging system 504 may send a message to the mobile device of user 501 via a short message service (SMS) or an application push notification with the unique hyperlink. User 501 may click on the unique hyperlink to access a list of orders and/or products that the user can select to facilitate a return or exchange.

In some embodiments, user 501, IVR system 502, RMS rule engine 503, and messaging system 504 may cooperate to fulfill a request for return or exchange of a product. By way of example, at step 505, user 501 may call customer service to request a return or exchange of a product using a mobile device associated with the user's account. When user 501 calls customer service at step 505, user 501 may reach IVR system 502. One or more processors of IVR system 502 may direct user 501 through various menu options, and user 501 may select a menu corresponding to product return or exchange. User 501 may select the menu corresponding to product return or exchange, for example, by inputting a selection using a keypad on the user's mobile device or by speaking the selection. IVR system 502 may be configured to receive and process the user's selection via speech recognition.

After receiving the request for return or exchange of a product at step 505, IVR system 502 may check with RMS rule engine 503 to identify at least one order satisfying a predetermined return criteria at step 506. For example, one or more processors of IVR system 502 may look up one or more previous orders associated with user 501 in a database, such as database 304 and apply the predetermined return criteria generated by RMS rule engine 503. The predetermined return criteria may establish one or more rules to determine whether one or more previous orders associated with user 501 are eligible for return or exchange via IVR system 502. By way of example, according to the predetermined return criteria, one or more previous orders associated with user 501 may not be eligible for return or exchange via IVR system 502 if at least one product is too expensive, if user 501 has returned at least one product in a predetermined time period, if at least one product is not eligible for return or exchange, if a return or exchange period for at least one product has expired, if at least one product is not eligible for online return, if there is no purchase history associated with user 501, if the number of products for return or exchange exceeds a predetermined threshold, if user 501 is associated with a prior violation in database 304 for previous attempts of fraud or policy violation, or if at least one product is associated with additional requests for return or exchange.

After identifying at least one order satisfying the predetermined return criteria, at step 507, RMS rule engine 503 may send a confirmation to IVR system 502 that user 501 is associated with at least one order satisfying the predetermined return criteria. Accordingly, IVR system 502 may allow user 501 to proceed with requesting product return or exchange. For example, at step 508, IVR system 502 may ask user 501 if user 501 is willing to proceed with self-service. If user 501 is willing to proceed with self-service to return or exchange a product, at step 509, user 501 may send a confirmation to IVR system 502. For example, user 501 may indicate that user 501 is willing to proceed with self-service via an input on a mobile device or by saying the confirmation. Once user 501 confirms that user 501 is willing to proceed with self-service, IVR system 502 may transmit the confirmation to RMS rule engine 503 at step 510.

In some embodiments, once RMS rule engine 503 receives the confirmation at step 510, RMS rule engine 503 may generate a unique hyperlink. At step 511, RMS rule engine 503 may send the unique hyperlink to a messaging system 504 such that messaging system 504 may send the unique hyperlink to a mobile device of user 501 at step 512. By way of example, the unique hyperlink may be assigned to the at least one order that satisfies the predetermined return criteria. Accordingly, when user 501 activates the unique hyperlink, for example by clicking on the hyperlink, the mobile device of user 501 may be configured to display the at least one order (e.g., order-level display). Additionally or alternatively, when user 501 activates the unique hyperlink, the mobile device of user 501 may be configured to display every product in every order associated with user 501 that satisfies the predetermined return criteria (e.g., product-level display). As such, the mobile device may display every product that user 501 has previously purchased and that is eligible for return or exchange via IVR system 502. Accordingly, the user may be able to conveniently select the specific product(s) that user 501 would like to request for return or exchange. In addition, the user 501 may be able to conveniently select a subset quantity of a specific product that user 501 would like to request for return or exchange. In contrast, it may be difficult for conventional systems (e.g., customer service agents) to handle returns on a product-by-product basis.

At step 512, messaging system 504 may send a message to the mobile device of user 501 via a short message service (SMS) or an application push notification with the unique hyperlink. User 501 may click on the unique hyperlink to access a list of orders and/or products that user 501 can select to facilitate a return or exchange. In some embodiments, when user 501 clicks on the unique hyperlink to activate it, the mobile device may be configured to open a software application on the mobile device. Accordingly, user 501 may be directed to the software application to send a request for return or exchange. Therefore, instead of a customer service agent facilitating a return or exchange of a product via a telephone communication, user 501 may quickly and efficiently have a request for return or exchange processed via a software application on the mobile device of user 501. As such, user 501 will not have to wait a long time on the phone for the customer service agent to complete the request for return or exchange, and customer service agents will not be overwhelmed with a large number of customer calls for product return or exchange.

In some embodiments, one or more processors 305 may send a message to the mobile device of the user via the application push notification without the unique hyperlink. For example, when one or more processors 305 is configured to process a return or exchange by sending an application push notification to the mobile device of the user, a unique hyperlink may not be necessary. Instead, one or more processors 305 may send a message to the mobile device of the user via the application push notification, and when the user opens the message, one or more processors 305 may automatically direct the mobile device of the user to display the application such that the user can access a list of orders and/or products that the user can select to facilitate a return or exchange.

At step 513, once user 501 has selected a product for return or exchange on the mobile device of user 501, RMS rule engine 503 may receive, from the mobile device of user 501, a selection of a product for return or exchange in the at least one order that satisfies the predetermined return criteria. Accordingly, RMS rule engine 503 may modify a database, such as database 304, to register the product for return or exchange. Additionally or alternatively, RMS rule engine 503 may send instructions to one or more systems in system 100 of FIG. 1A to fulfill the user's request for product return or exchange. For example, RMS rule engine 503 may send instructions to SCM system 117 of FIG. 1A to pick up or retrieve the product for return or exchange from the user. In other embodiments, one or more processors 305 may send instructions to a delivery worker, such as delivery workers 224A and 224B of FIG. 2, to pick up the product for return or exchange from the user. In yet another embodiment, one or more processors 305 may send instructions to a transportation management system, such as transportation system 107 of FIG. 1A, to dispatch one or more delivery workers, such as delivery workers 224A and 224B of FIG. 2, and/or one or more vehicles, such as truck 222 and/or car 226 of FIG. 2, to pick up the product for return or exchange from the user. In some embodiments, after modifying a database, such as database 304, to register the product for return or exchange, one or more processors 305 may process a refund for the customer when the predetermined return criteria is met and customer chose return.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for call deflection, the system comprising:
    a memory storing instructions; and
    at least one processor configured to execute the instructions to:
        receive a request for return or exchange, wherein the request for return or exchange is transmitted through an interactive voice response (IVR) system from a mobile device;
        access a purchase history of the user to identify at least one order satisfying a predetermined return criteria;
        generate a unique hyperlink, wherein the unique hyperlink is assigned to the at least one order that satisfies the predetermined return criteria such that, when activated by the user, the mobile device is configured to display the at least one order, wherein:
            the unique hyperlink is configured to navigate the user to a web browser or a software application when activated by the user, and
            the unique hyperlink is unique to each request for return or exchange;
        send the unique hyperlink to the mobile device of the user;
        receive, from the mobile device of the user, a selection of a product in the at least one order for return or exchange; and
        modify a database to register the product for return or exchange.
2. The system of claim 1, wherein accessing a purchase history of the user comprises identifying, from the database, every order that is mapped to a phone number associated with the mobile device of the user.
3. The system of claim 1, wherein the at least one processor is further configured to execute the instructions to send instructions to a remote device to retrieve the product for return or exchange from the user.
4. The system of claim 1, wherein, when the unique hyperlink is activated by the user, the mobile device is configured to display every product in every order that satisfies the predetermined return criteria.
5. The system of claim 1, wherein the at least one order satisfies the predetermined return criteria if each product in the at least one order does not exceed a predetermined cost threshold.
6. The system of claim 1, wherein the at least one order satisfies the predetermined return criteria if at least one product in the at least one order does not exceed a predetermined expiration period for return or exchange.
7. The system of claim 1, wherein the at least one order satisfies the predetermined return criteria if each product in the at least one order is eligible for online return or exchange.
8. The system of claim 1, wherein the at least one order satisfies the predetermined return criteria if at least one product in the at least one order is eligible for online return or exchange.
9. The system of claim 1, wherein the at least one order satisfies the predetermined return criteria if the user associated with the at least one order is not associated with a prior violation.
10. The system of claim 1, wherein the at least one order satisfies the predetermined return criteria if the at least one order is not associated with additional requests for return or exchange.
11. A computer-implemented method for call deflection, the method comprising:
    receiving a request for return or exchange, wherein the request for return or exchange is transmitted through an interactive voice response (IVR) system from a mobile device;
    accessing a purchase history of the user to identify at least one order satisfying a predetermined return criteria;
    generating a unique hyperlink for the user, wherein the unique hyperlink is assigned to the at least one order that satisfies the predetermined return criteria such that, when activated by the user, the mobile device is configured to display the at least one order, wherein:
        the unique hyperlink is configured to navigate the user to a web browser or a software application when activated by the user, and
        the unique hyperlink is unique to each request for return or exchange;
    sending the unique hyperlink to the mobile device of the user;
    receiving, from the mobile device of the user, a selection of at least one product in the at least one order for return or exchange; and
    modifying a database to register the at least one product for return or exchange.
12. The method of claim 11, wherein accessing a purchase history of the user comprises identifying, from the database, every order that is mapped to a phone number associated with the mobile device of the user.
13. The method of claim 11, further comprising sending instructions to a remote device to retrieve the product for return or exchange from the user.
14. The method of claim 11, wherein, when the unique hyperlink is activated by the user, the mobile device is configured to display every product in every order that satisfies the predetermined return criteria.
15. The method of claim 11, wherein the at least one order satisfies the predetermined return criteria if each product in the at least one order does not exceed a predetermined cost threshold.

16. The method of claim 11, wherein the at least one order satisfies the predetermined return criteria if at least one product in the at least one order does not exceed a predetermined expiration period for return or exchange.

17. The method of claim 11, wherein the at least one order satisfies the predetermined return criteria if each product in the at least one order is eligible for online return or exchange.

18. The method of claim 11, wherein the at least one order satisfies the predetermined return criteria if at least one product in the at least one order is eligible for online return or exchange.

19. The method of claim 11, wherein the at least one order satisfies the predetermined return criteria if the at least one order is not associated with additional requests for return or exchange.

20. A computer-implemented system for call deflection, the system comprising:
   a memory storing instructions; and
   at least one processor configured to execute the instructions to:
      receive a request for return or exchange, wherein the request for return or exchange is transmitted through an interactive voice response (IVR) system;
      access a purchase history of the user to identify at least one order satisfying a predetermined return criteria, wherein the at least one order satisfies the predetermined return criteria if:
         a product in the at least one order is eligible for online return or exchange; and
         each product in the at least one order does not exceed a predetermined cost threshold;
      generate a unique hyperlink for the user, wherein the unique hyperlink is assigned to the at least one order that satisfies the predetermined return criteria such that, when activated by the user, a mobile device is configured to display the at least one order, wherein:
         the unique hyperlink is configured to navigate the user to a web browser or a software application when activated by the user, and
         the unique hyperlink is unique to each request for return or exchange;
      send the unique hyperlink to the mobile device of the user;
      receive, from the mobile device of the user, a selection of at least one product in the at least one order for return or exchange; and
      modify a database to register the at least one product for return or exchange.

\* \* \* \* \*